United States Patent [19]

Luper

[11] 4,370,152

[45] Jan. 25, 1983

[54] GAS DRYER CARTRIDGE

[75] Inventor: Charles R. Luper, Anaheim, Calif.

[73] Assignee: Beckman Instruments, Inc., Fullerton, Calif.

[21] Appl. No.: 278,777

[22] Filed: Jun. 29, 1981

[51] Int. Cl.³ ............................................. B01D 53/26
[52] U.S. Cl. ...................................... 55/281; 55/316; 55/388
[58] Field of Search ................ 55/275, 280, 281, 316, 55/387, 388, 418, 466

[56] References Cited

U.S. PATENT DOCUMENTS

| 2,199,258 | 4/1940 | Gray | 55/316 X |
|---|---|---|---|
| 2,325,657 | 8/1943 | Burkness | 55/316 X |
| 2,465,162 | 3/1949 | Lockwood | 55/387 X |
| 2,504,184 | 4/1950 | Dawson | 55/316 |
| 2,728,407 | 12/1955 | Squier | 55/387 X |
| 2,987,175 | 6/1961 | Bottum | 55/387 X |
| 3,066,462 | 12/1962 | Yap et al. | 55/466 X |
| 3,246,454 | 4/1966 | Norton | 55/388 X |
| 3,303,621 | 2/1967 | Hill | 55/388 |
| 3,683,596 | 8/1972 | Ashley | 55/389 X |
| 3,705,480 | 12/1972 | Wireman | 55/275 |
| 3,853,475 | 12/1974 | Gordon et al. | 55/388 X |

FOREIGN PATENT DOCUMENTS

| 886813 | 10/1943 | France | 55/388 |
|---|---|---|---|
| 11861 | of 1914 | United Kingdom | 55/275 |

OTHER PUBLICATIONS

American Standard Dimensions of Glass & Metal Luer Tapers for Medical Applications, 8/16/55, pp. 5-9.

Primary Examiner—Robert H. Spitzer
Attorney, Agent, or Firm—R. J. Steinmeyer; P. R. Harder; Edward C. Jason

[57] ABSTRACT

A gas dryer cartridge for removing the moisture from a sample gas stream prior to the application thereof to a metabolic measuring instrument. A dryer housing having an inlet and an outlet is partitioned into a first, gas drying chamber containing a desiccant and a second, liquid collecting chamber containing an absorbent liquid retaining element. The volume of the liquid collecting chamber is made sufficiently large that it can contain the liquid produced in the event that the desiccant is liquefied as a result of prolonged use. The liquid retaining element prevents the collected liquid from being swept up in the gas stream during the removal or replacement of the cartridge.

3 Claims, 4 Drawing Figures

GAS DRYER CARTRIDGE

BACKGROUND OF THE INVENTION

The present invention relates to gas dryers for removing the moisture from a sample gas stream, and is directed more particularly to a gas dryer cartridge having a liquid collecting chamber for receiving and retaining the liquid produced during the operation of the dryer.

Under circumstances where measurements are to be made on a moisture-laden gas, such as human breath, it is frequently desirable to first remove the water therefrom. This is because the failure to remove such water can significantly affect the accuracy of measurements made on the gas as, for example, by condensing on the interior surfaces of the instrument. Depending on the type of instrument, the presence of water may also be objectionable because of its activity as an interfering component.

Prior to the present invention, gas dryers have typically included a generally cylindrical housing having an inlet and an outlet at opposite ends thereof. Within the housing was located a body of a desiccating material, such as calcium chloride, which was held in place by upstream and downstream retaining elements, such as metal screens. While such dryers perform satisfactorily under conditions in which their desiccants are not allowed to exceed their maximum water absorbing capacities, they can adversely affect the operation of an instrument with which they are used, if those water absorbing capacities are exceeded. If, for example, the length of a series of measurements, or inattention on the part of an operator causes a dryer cartridge to be used too long, the desiccant will exceed its maximum capacity. When this occurs, the desiccant will begin to liquefy, forming a salt solution which can escape from the desiccant. This salt solution can, in turn, be swept up by the gas stream and carried into the associated instrument. Should such a condition occur near the end of a long sequence of measurements, it can result in the non-usability of the data taken during the entire sequence. In an extreme case, in which a large part of the desiccant is liquefied, substantial quantities of this liquid may be drawn into the instrument causing clogging, corrosion or other serious damage.

SUMMARY OF THE INVENTION

In accordance with the present invention there is provided an improved gas dryer cartridge which operates in the desired manner to remove moisture from a sample gas stream, and yet which prevents liquid appearing within the cartridge from escaping therefrom and interfering with the operation of an associated instrument.

More particularly, the dryer cartridge of the present invention includes a housing the interior of which is partitioned into a gas drying chamber and a liquid collecting chamber. In the preferred embodiment, the liquid collecting chamber is located below the gas drying chamber so that any liquid produced therein flows into the liquid collecting chamber under the force of gravity. Once this liquid reaches the collecting chamber, the structure of the inlet line assures that it is effectively prevented from having further contact with the gas stream.

In accordance with one important feature of the present invention, the volume of the liquid collecting chamber is made sufficiently large that it can contain the liquid produced by the liquefaction of the entire desiccant. In this manner, it is assured that, even under worst case conditions, an associated instrument will be protected from the damaging effect of exposure to a salt solution.

In accordance with another important feature of the present invention, the liquid collecting chamber is filled with an absorbent material such as cotton or a plastic foam which can retain liquid therein by capillary action. In this manner, the liquid collected in the liquid collecting chamber is prevented from escaping therefrom even if the dryer cartridge is tilted or shaken. This, in turn, prevents the collected liquid from being drawn into the instrument inadvertently as the dryer cartridge is being removed and replaced. Thus, while liquid may enter the liquid collecting chamber under the force of gravity, it is retained therein by capillary action to provide an extra measure of protection for the instrument with which it is used.

Optionally, if the dryer cartridge is constructed from a transparent material, it may be provided with a desiccant to which has been added a moisture indicating compound such as cobalt chloride. Because the color of the latter compound changes as a function of its moisture content, it may be used as a direct indication of the degree to which the useful drying capacity of the desiccant has been exhausted. This, in turn, allows the dryer cartridge to be replaced before the exhaustion of the desiccant affects the accuracy of the measurement made with the associated instrument.

DESCRIPTION OF THE PREFERRED EMBODIMENT

Figures 1, 2, 3:
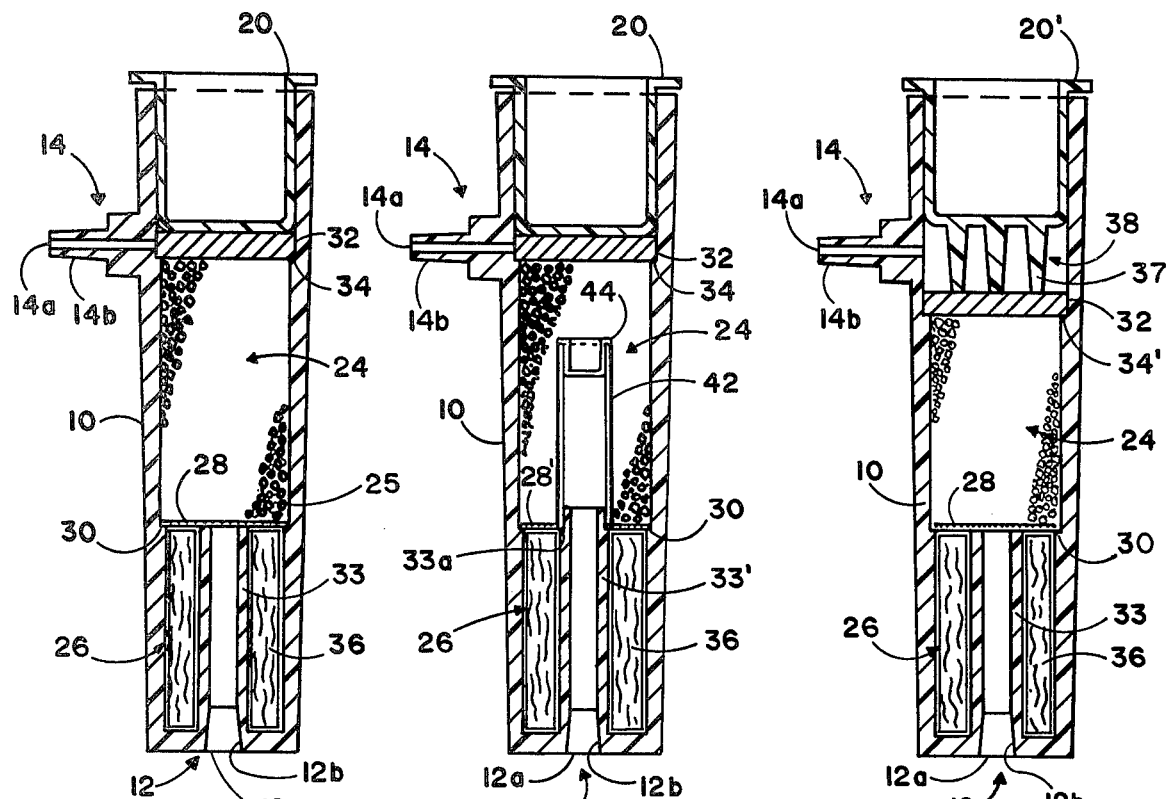
FIG. 1 is a cross-sectional view of one embodiment of a dryer cartridge constructed in accordance with the present invention.
FIG. 2 is a cross-sectional view of another embodiment of the present invention.
FIGS. 3 and 4 illustrate alternative dryer outlet configurations that may be utilized with the embodiments of FIGS. 1 and 2.

Referring to FIG. 1, there is shown a cross-sectional view of the preferred embodiment of a dryer cartridge constructed in accordance with the present invention. This dryer cartridge includes a one-piece clear plastic housing 10 having an inlet fitting or coupling 12 and an outlet fitting or coupling 14. Inlet coupling 12 preferably includes an opening 12a and a tapered internal surface 12b that is adapted to receive the male end of a standard luer-type fitting. Similarly, outlet coupling 14 preferably includes an opening 14a and a tapered projection 14b that is adapted to fit into the female end of a standard luer-type fitting. Connections to both of the above couplings are made without threads or other fasteners, the friction between the jointed members being sufficient to provide the desired, substantially gas-tight connection.

Closing the upper end of housing 10 is a cap 20 which may be made of any suitable plastic material having sufficient flexibility to form a substantially gas-tight seal with housing 10 when pressed into the end thereof. By being located at the end of housing 10, away from outlet coupling 14, cap 20 provides a convenient means for sealing housing 10 after the latter has been assembled and packed with desiccant.

In accordance with the present invention, the interior of housing 10 is partitioned into a first, generally cylindrical chamber 24 that serves as a gas drying chamber, and a second, generally annular chamber 26 that serves as a liquid collecting chamber. As shown in FIG. 1, these two chambers are separated by a retaining element 28, such as a screen, which permits gases and liquids to pass therethrough, but which does not allow the passage of granules of the desiccant 25. Retaining element 28 rests on a shoulder 30 in the side of housing 10. A fraction of an inch below element 28 is an extension tube 33 that connects inlet 12 directly to gas drying chamber 24. Because the end of tube 33 is slightly below element 28, gas flowing through tube 33 can distribute itself relatively evenly over the lower end of chamber 24.

Closing the upper end of chamber 24 is a retaining element 32 which rests against an internal shoulder 34 in housing 10, and which is held in place thereagainst by cap 20. Unlike retaining element 28, retaining element 32 is preferably a disc of a plastic foam material which allows the flow of gases therethrough, but which inhibits the flow of liquids. As a result, even through element 32 is located directly in front of the opening 14a, it does not substantially restrict the flow of gases between inlet 12 and outlet 14.

As will be explained more fully presently, porous disc 32 does not ordinarily come into contact with liquid from within housing 10. Nevertheless, should such liquid come into contact with disc 32, it may become trapped therein if disc 32 is made of a hydrophilic material. This trapping would, in turn, limit the rate of gas flow through disc 32. In order to prevent this from occurring, disc 32 is preferably constructed of a material having hydrophobic properties.

To the end that gas entering inlet 12 may have the moisture removed therefrom before flowing out of outlet 14, gas drying chamber 24 is filled with a suitable granular desiccant 25, such as calcium chloride. These granules are preferably sufficiently coarse that they provide a low resistance to the flow of gas between inlet 12 and outlet 14 and are unable to pass through the openings in retaining element 28 or 32. Optionally, if housing 10 is constructed of a transparent material, these granules may be provided with a thin coating of cobalt chloride to serve as a moisture indicator. If this is done the operator may determine the degree to which the calcium chloride has exhausted its moisture absorbing capacity on the basis of the colors observed through housing 10.

To the end that any free liquid that appears in gas drying chamber 24 may be removed therefrom before it accumulates to a level at which it can be swept up by the sample gas stream, a liquid collecting chamber 26 is located below gas drying chamber 24. In the embodiment of FIG. 1, this liquid collecting chamber comprises the generally annular shaped region between housing 10 and extension tube 33. Equivalently, liquid collecting chamber 26 may be visualized as a cylindrical chamber that is penetrated by extension tube 33. The important thing is that extension tube 33 provides inlet 12 with direct access to gas drying chamber 24 and at the same time separates inlet 12 from liquid collecting chamber 26. Accordingly, it will be understood that similar results will occur if inlet 12 and tube 33 to penetrate housing 10 from the side, rather than from the bottom as shown in FIG. 1.

In accordance with another feature of the present invention, the volume of liquid collecting chamber 26 is made sufficiently large that, even under a worst case condition, it can contain the entire quantity of liquid that may be released within gas drying chamber 24. Preferably the volume of chamber 26 is slightly greater than the latter volume so that the top of tube 33 will extend above rather than merely to the surface of the liquid, even when the maximum quantity of liquid is present. Thus, liquid collecting chamber 26 serves as a sump which, by removing the liquid from contact with the gas flow stream, prevents liquid from being drawn into outlet 14.

In dryer cartridges such as that shown in FIG. 1, the movements that accompany the disconnection of a spent dryer cartridge can cause some of the liquid within chamber 26 to be dislodged and swept up by the still flowing gas stream just prior to the disconnection of outlet 14. In order to prevent this from occurring, chamber 26 is preferably provided with an absorbent, liquid-retaining element 36 made up of a material such as cotton or a spongy plastic material. In general, element 36 should have a structure and porosity such that liquid absorbed thereby becomes trapped therein by capillary forces, without regard to changes in the orientation of housing 10. In this manner, the dryer cartridge of FIG. 1 may undergo as much tilting and twisting as is necessary to disconnect the same, without allowing trapped liquid to escape from chamber 26. Thus, liquid retaining element 36 protects a downstream instrument not only during operation, but also during the cartridge replacement process.

Referring to FIG. 2, there is shown an alternative embodiment of the invention in which the retaining element that separates the gas drying and liquid collecting chambers of housing 10 is different from the retaining element that separates the gas drying chamber from inlet 12. More particularly, gas drying chamber 24 of FIG. 2 is separated from liquid collecting chamber 26 thereof by a generally annular shaped retaining element 28' which rests on shoulder 33a of extension tube 33' and on shoulder 30 of housing 10. In addition, gas drying chamber 24 of FIG. 2 is separated from inlet 12 by a generally cylindrical, gas transmissive retaining element 42 which may, for example, comprise a roll of porous paper the end of which is closed by a cap 44.

The advantage of having retaining elements 28' and 42 which are of different types is that it permits the optimization of various gas and liquid flow relationships within the dryer. It permits, for example, the use of relatively coarse openings in element 28', thereby facilitating the flow of liquid from chamber 24 to chamber 26. On the other hand, it permits the use of relatively fine openings in element 42, thereby providing particulate filtering for the sample gas stream. Thus, the embodiment of FIG. 2 makes unnecessary the tradeoffs that may be associated with the use of a single retaining element of the type shown in FIG. 1.

Figure 4:
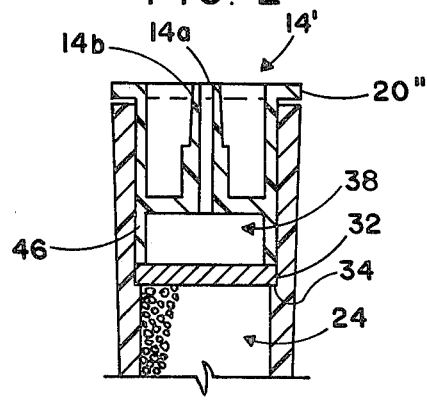

In the event that locating porous retaining disc 32 of FIGS. 1 and 2 immediately in front of opening 14a is found to excessively restrict the flow of sample gas, disc 32 may be relocated to a position in which opening 14a is exposed to an open gas filled space. Embodiments of the invention in which disc 32 has been relocated in this manner are shown in FIGS. 3 and 4. In FIG. 3, for example, disc 32 rests on a shoulder 34', which is lower than corresponding shoulder 34 of FIG. 1, and is secured in place by one or more fingers 37 that project from a modified cap 20′. As a result, the embodiment of FIG. 3 allows gas to be drawn through opening 14*a*, from an open space 38, substantially equally from all points on disc 32, rather than just from the adjacent portion of disc 32, as shown in the embodiments of FIGS. 1 and 2. It will therefore be seen that, for a given pore size in disc 32, the embodiment of FIG. 3 provides less resistance to the flow of sample gas through the cartridge than the embodiments of FIGS. 1 and 2.

While each of the embodiments of FIGS. 1-3 shows an outlet 14 which projects from the side rather than from the end of housing 10, this location is not a necessary one. Referring to FIG. 4, for example, there is shown in part an embodiment of the invention in which the outlet 14′ is located at the end of the dryer cartridge by including it as a part of a modified end cap 20″. In all other respects, the embodiment of FIG. 4 is functionally the same as those of FIGS. 1-3. Moreover, because modified end cap 20″ of FIG. 4 may be provided with a ring-shaped downward projection 46, the embodiment of FIG. 4 may also be provided with the same type of open gas filled space 38 that was described in connection with FIG. 3.

In view of the foregoing, it will be seen that the dryer cartridge of the invention not only provides the desired gas drying function, but does so in a way that protects an associated instrument from the water released from a desiccant after prolonged use. In addition, the dryer cartridge of the invention includes an absorbent element which allows this protection to continue even in the presence of the movements that accompany the removal of a cartridge containing a completely liquefied desiccant.

While the present invention has been described in the context of a number of specific embodiments, the true spirit and scope of the present invention should be determined only with reference to the following claims.

What is claimed is:

1. A dryer cartridge for removing moisture from a gas stream including, in combination:
    (a) a generally tubular housing having an upper end and a lower end, said housing being partitioned into an upper, gas drying chamber and a lower, liquid collecting chamber,
    (b) an inlet tube extending from the lower end of the housing, through the liquid collecting chamber, to provide a path for the flow of gas from the exterior of the housing to the gas drying chamber, the space between the tube and the housing defining the liquid collecting chamber,
    (c) an outlet extending from the gas drying chamber to the exterior of the housing,
    (d) upper and lower retaining members for retaining a dessicant material within the gas drying chamber while permitting gas to flow therethrough,
    (e) an end cap closing the upper end of the housing, said end cap serving to maintain the upper retaining member in contact with the dessicant material,
    (f) a liquid retaining element in the liquid collecting chamber,
    (g) the volume of the liquid collecting chamber being sufficient to contain the liquid produced as a result of the liquefaction of the dessicant material.

2. The dryer cartridge of claim 1 in which the upper retaining member is comprised of a porous hydrophobic material.

3. The dryer cartridge of claim 1 or 2 in which the lower retaining member rests on the end of the inlet tube.

* * * * *